2,927,930

NITROSOARYLAMINOMETHYLIMIDES

John J. D'Amico, Nitro, W. Va., assignor to Monsanto Chemical Company, St. Louis, Mo., a corporation of Delaware No Drawing. Application September 30, 1957
Serial No. 686,855

8 Claims. (Cl. 260—326)

The present invention relates to nitrosoarylaminomethylimides, to methods for their preparation and to methods for their use, especially for processing vulcanizable elastomers by reacting with the new compounds at elevated temperatures. These compounds possess a combination of valuable properties including high thermal stability.

It has long been known that nitroso mixed aromatic aliphatic amines having a nitroso substituent on the aromatic ring have useful properties in the industrial arts but these compounds are of limited thermal stability. The optimum stability is apparently achieved by selecting methyl as the aliphatic substituent but thermal stability is still marginal. However, it has now been discovered that substitution of a hydrogen atom on the methyl group by a radical derived from an imide increases thermal stability.

The new compounds may be regarded as derivatives of N-methyl C-nitroso aromatic amines in which nitrogen replaces the hydrogen in its methyl group to provide a structure in which two nitrogen atoms are linked by a methylene group, one nitrogen being further linked to a nitroso substituted aromatic group and the second being part of an imide ring, the methylene group replacing imidohydrogen. By an imide ring is meant a structure in which the nitrogen is part of two acid groups which acid groups are connected to form a closed ring. It will be noted that imido is not used synonymously with imino but is used in its usual and more restricted sense to mean a structure in which the nitrogen is part of an acid group.

An imide may be defined as a compound derived from acid anhydrides in which oxygen is replaced by nitrogen. In conformity with this definition the amide nitrogen in the compounds of the present invention may be linked to

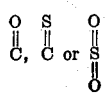

groups, these being residues of acid groups after removal of OH. Furthermore, the manner in which the residues of the two acid groups are connected significantly influences the properties. They are preferably connected through two carbon atoms which are part of an aromatic ring. Further substitution is permissible in either or both aromatic rings, particularly halogen, lower alkyl, lower alkoxy and nitro substituents.

It is evident from the foregoing that one valence of the amino nitrogen is satisfied by methylene and a second valence by a nitroso substituted aromatic radical. The remaining valence may be satisfied by hydrogen or a nitroso group or by an organic substituent, as for example, alkyl, cyanoalkyl, carboalkoxyalkyl or carboxyalkyl. The radicals are listed essentially in order of decreasing preference. In general, presence of an organic substituent reduces reactivity of the compounds towards elastomers.

Compounds typical of the new class comprise

N-(p-nitrosoanilinomethyl)-maleimide,
N-(3-methyl-4-nitrosoanilinomethyl)-phthalimide,
4-nitro-N-(p-nitrosoanilinomethyl)-phthalimide,
4-chloro-N-(p-nitrosoanilinomethyl)-phthalimide,
4 - chloro - N-(3-chloro-4-nitrosoanilinomethyl)-phthalimide,
2 - (p - nitrosoanilinomethyl)-1,2-benzisothiazolin-3-one, 1,1-dioxide,
2 - (p-nitrosoanilinomethyl)-1,2-benzisothiazolin-3-thione, 1,1-dioxide,
N-(p-nitrosoanilinomethyl)-thiophthalimide,
N-(p-nitrosoanilinomethyl)-dithiophthalimide,
N - (p - nitrosoanilinomethyl)-bicyclo[2.2.1]-hept-5-ene-2,3-dicarboximide,
N - (p - nitrosoanilinomethyl)-4,5-dimethyl-1,2,3,6-tetrahydrophthalimide,
N-(p-nitrosoanilinomethyl)-tetrachlorophthalimide,
3-(p-nitrosoanilinomethyl)-2,4-thiazolidine-dione and
bis-(p-nitrosoanilinomethyl)-pyromellitimide.

The new compounds may be prepared by reacting the corresponding bases with nitrosating agents. The bases required as intermediates are either known compounds or may be prepared in known manner from the imides. A method described by Sachs, Ber. 31, pp. 3232, 3235 (1898) is suitable. According to this method an imide is preliminarily reacted with formaldehyde to produce an imido-oxy-methylene compound which is converted to the corresponding halide and further treated with the amine. The imido-oxy-methylene compound may be reacted directly with the aromatic amine in which case water is removed from the reaction as a by-product in place of the hydrogen halide split off when employing the method of Sachs. See Winstead et al., J. Am. Chem. Soc. 77, 1913 (1955) and Heine et al., ibid., 78, 672 (1956) for suitable intermediates and methods for their preparation. The imido-oxy-methylenes form readily by reacting formaldehyde with an imide. A typical preparation is described in Example 1.

The new compounds form salts with strong inorganic acids and metal salts and form metal salt complexes. These derivatives are also useful and are encompassed by the present invention. Salts of such acids as hydrochloric and orthophosphoric may be prepared by methods previously described for preparation of salts of nitrosoaryl amines. Metal salts are formed by adding a soluble salt of the desired metal to an aqueous solution of the nitrosoamine. Metallic salt complexes may be prepared by reacting nitrosoaryl amine in solution in an organic solvent with a solution of the metal salt. Some metal salts which may be cited as examples are $CuCl_2$, $FeCl_3$, $NiCl_2$, $AgCl_2$, $CdCl_2$, $MnCl_4$ and $CaCl_2$.

EXAMPLE 1

*N-(p-nitrosoanilinomethyl)phthalimide*

To a stirred suspension of 147.2 grams (1.0 mole) of phthalimide in 1000 ml. of ethyl alcohol is added in one portion 108 grams (1.23 moles) of 37% formaldehyde. The stirred mixture is brought to reflux (75–80° C.) and 105 grams (1.13 moles) of aniline added in one portion. The mixture is stirred and heated at refluxing temperature (75–80° C.) for one hour. After cooling to 10° C. the yellow solid which had precipitated is separated by filtering from solution, washed with water and air dried to obtain 241 grams (95.3% yield) of N-anilinomethyl phthalimide, M.P. 143–144° C. Substitution of 800 ml. of water for 1000 ml. of ethyl alcohol in the foregoing procedure and heating at 95–100° C. for one hour gives slightly higher yield of the same product.

To 439 grams of a 41.7% solution of hydrogen chloride in methyl alcohol (5 moles) is added at 5° C. 126 grams (0.5 mole) of anilinomethyl phthalimide. After cooling to 5° C. 40 grams (0.56 mole) of 97% sodium nitrite is added in one portion. External cooling is then removed after which the temperature rises to 25° C. in one hour. Stirring is continued for 4 hours at 25–40° C. The temperature reaches 40° C. after 3.5 hours, then slowly declines to 25° C. The mass is then added to 1500 grams of an ice-water mixture. Concentrated ammonium hydroxide is added to the batch at 5–10° C. until a pH of 8 has been reached. Stirring is continued at 5–10° C. for one additional hour. The green solid which has formed is filtered, washed with a liter of water and air dried. There is obtained 140.5 grams, essentially quantitative yield, of the desired product, M.P. 183–185° C. The product purified by recrystallization melts at 185–187° C. Below is the analysis as compared to the values calculated for $C_{15}H_{11}N_3O_3$:

|  | Calculated, percent | Found, percent |
|---|---|---|
| Hydrogen | 3.94 | 4.15 |
| Carbon | 64.05 | 64.18 |
| Nitrogen | 14.94 | 15.21 |

If desired the intermediate N-nitroso compound may be isolated. A glass reaction vessel is charged with 25.3 grams (0.1 mole) of anilino-methyl-phthalimide and 340 ml. of ethyl alcohol. The charge is stirred and heated to 70° C. for a few minutes and then cooled to 5° C. There is then added in one portion 12 ml. of concentrated hydrochloric acid and 8 grams (0.11 mole) of 97% sodium nitrite dissolved in 12 ml. of water. An exothermic reaction sets in causing a temperature rise from 5 to 20° C. After stirring at 10–20° C. for one hour, 200 ml. of water is added and stirring continued for one-half hour. The precipitate is filtered, washed with water until neutral to litmus and air dried at 20–30° C. N-(N-nitrosoanilinomethyl)phthalimide is obtained in a yield of 96.1%, M.P. 151–154° C. After recrystallization from benzene the M.P. is 154–156° C. Analysis gives 14.64% nitrogen as compared to 14.94% calculated for $C_{15}H_{11}N_3O_3$.

EXAMPLE 2

*N-(3-chloro-4-nitrosoanilinomethyl)phthalimide*

A glass reaction vessel is charged with 550 grams (6.0 moles) of a 40% solution of hydrogen chloride in methyl alcohol. The solution is cooled to 5° C. and stirred during the addition of 143 grams (0.5 mole) of N-(m-chloroanilinomethyl)-phthalimide. The reaction mixture is again cooled to 5° C. and 40 grams (0.56 mole) of 97% sodium nitrite added in one portion. The reaction mixture is stirred at 25–30° C. for 17 hours and then added gradually to 1500 grams of stirred ice water. Concentrated ammonium hydroxide is added at 0–10° C. until the pH is 8. Stirring is continued for one additional hour at 0–10° C. after which the solids are filtered, washed with water and air dried at room temperature. The product, M.P. 162–164° C., is obtained in a yield of 97%. Stirring 139 grams of crude product in two liters of acetone followed by filtering and air drying raises the M.P. to 189–195° C. The product after recrystallizing from acetone-water mixture melts at 223–225° C. Analysis gives 13.56% nitrogen and 11.40% chlorine as compared to 13.36% nitrogen and 11.24% chlorine calculated for $C_{15}H_{10}ClN_3O_3$.

EXAMPLE 3

*N-(3-bromo-4-nitrosoanilinomethyl)phthalimide*

Substituting in the same molecular ratio N-(m-bromoanilinomethyl)phthalimide for N-(m-chloroanilinomethyl)phthalimide in the foregoing procedure gives a 97% yield of N-(3-bromo-4-nitrosoanilinomethyl)phthalimide, M.P. 163–166° C. To purify, 144 grams is stirred for one hour in one liter of acetone, filtered and dried. The product then melts at 201–203° C. Analysis gives 11.9% nitrogen and 22.55% bromine as compared to 11.67% nitrogen and 22.19% bromine calculated for $C_{15}H_{10}N_3O_3Br$.

EXAMPLE 4

*N-(N-methyl-p-nitrosoanilinomethyl)phthalimide*

Into a glass container is charged 70 ml. of concentrated hydrochloric acid. The acid is cooled by an ice bath and 40 grams (0.15 mole) of N-(N-methylanilinomethyl)-phthalimide added in one portion. The mixture is stirred while 150 grams of ice is added to lower the temperature to 5° C. A solution of 12 grams of sodium nitrite in 30 ml. of water is added dropwise at 5–10° C. in 15 minutes. After stirring for one hour at 0–10° C. the precipitate is filtered from the reaction mixture, washed with 40 ml. of dilute hydrochloric acid (1:1) and then with 200 ml. of ethyl ether. The product is then added to 2000 grams of ice water and 25% sodium hydroxide solution added to the water until the pH is 8. After stirring for 30 minutes the solids are filtered, washed with water and air dried. The crude product is obtained in essentially quantitative yield. After purification by recrystallizing from a mixture of methyl alcohol and ethyl acetate, the M.P. is 184–186° C. Analysis gives 13.98% nitrogen as compared to 14.23% calculated for $$C_{16}H_{13}N_3O_3$$

EXAMPLE 5

*N-(3-chloro-N,4-dinitrosoanilinomethyl)phthalimide*

A mixture of 31.6 grams (0.1 mole) of N-(3-chloro-4-nitrosoanilinomethyl)phthalimide in 392 grams of ethyl alcohol is stirred and heated to 70° C. The resulting solution is cooled to 15° C. and 14.5 grams of concentrated hydrochloric acid added dropwise over a five minute period. After cooling the stirred reaction mixture to 9° C., 8 grams of sodium nitrite dissolved in 43 grams of water is added in one portion. An exothermic reaction sets in causing a temperature rise from 9 to 14° C. External cooling is maintained and the stirred reaction mixture held at 5–10° C. for 2½ hours. There is then added 400 ml. of cold water. After stirring for five minutes the solids are filtered and air dried. The yield is 84.2% of product M.P. 206–208° C. Analysis gives 15.93% nitrogen and 10.7% chlorine as compared to 16.25% nitrogen and 10.29% chlorine calculated for $C_{15}H_9ClN_4O_4$.

Similar results are obtained by adding the nitrite solution to an alcoholic solution of nitrosoamine at 50° C. followed by hydrochloric acid at 55° C.

EXAMPLE 6

*N-[N-ethyl-N-(p-nitrosoanilino)methyl]phthalimide*

Substitution of N-(N-ethylanilinomethyl)phthalimide in the same molecular proportion for N-(N-methylanilinomethyl)phthalimide in the procedure of Example 4 gives an 89.5% yield of N-[N-ethyl-N-(p-nitrosoanilino)-methyl]phthalimide, M.P. 161–163° C. After purification by recrystallizing from a mixture of ethyl alcohol, the product melts at 173–175° C. Analysis gives 13.35% nitrogen as compared to 13.58% calculated for $$C_{17}H_{15}N_3O_3$$

EXAMPLE 7

*N-[N-(2-cyanoethyl)-4-nitrosoanilinomethyl]phthalimide*

Substituting N - [N - (2 - cyanoethyl)anilinomethyl]-phthalimide in the same molecular ratio for N-(N-methylanilinomethyl)phthalimide in the procedure of Example 4 gives a 52% yield of N-[N-(2-cyanoethyl-4-nitrosoanilinomethyl]phthalimide, M.P. 130–135° C. After recrystallizing from ethyl alcohol the product melts at 135–137° C. Analysis gives 16.66% nitrogen as compared to 16.76% calculated for $C_{18}H_{14}N_4O_3$.

EXAMPLE 8

*Methyl N-(p-nitrosophenyl)-N-(phthalimidomethyl)-β-alaninate*

Substituting methyl N-phenyl-N-phthalimidomethyl-β-alaninate in the same molecular proportion for N-(N-methylanilinomethyl)phthalimide in the procedure of Example 4 gives the desired product. After recrystallization from ethyl alcohol the product melts at 133–134° C. Analysis gives 11.22% nitrogen as compared to 11.44% calculated for $C_{19}H_{17}N_3O_5$.

EXAMPLE 9

*N-(p-nitrosoanilinomethyl)succinimide*

A glass reactor is charged with 429 grams (5.0 moles) of 42.5% hydrogen chloride in methanol and the solution cooled to 5° C. and stirred while there is added in one portion 95 grams (0.5 mole) of N-(anilinomethyl)-succinimide. The reaction mixture is stirred for four hours at 10–20° C. and added to 1500 grams of ice water. Ammonium hydroxide is added at 0–10° C. until the pH is 8. After stirring for an hour at 0–10° C. the solids are filtered from solution, washed with water and air dried. The crude product is obtained in 75% yield. After recrystallizing from ethyl alcohol and washing with ether, the product melts at 171–174° C. To isolate the intermediate N-(N-nitrosoanilinomethyl)-succinimide, a reactor is charged with 20.4 grams (0.1 mole) of N-anilinomethyl succinimide and 340 ml. of ethyl alcohol. The charge is stirred and heated to 70° C. for a few minutes and then cooled to 5° C. There is added in one portion 12 ml. of concentrated hydrochloric acid and 8 grams (0.11 mole) of 97% sodium nitrite dissolved in 12 ml. of water. The reaction mixture is stirred at 10–20° C. for about one hour, 200 ml. of water added, and stirring continued for one-half hour. The precipitate is filtered, washed with water until neutral to litmus and air dried at 25–30° C. The yield of N-(N-nitrosoanilinomethyl)succinimide is 86% of product M.P. 131–133° C. After recrystallizing from methyl alcohol the product melts at 132–134° C. Analysis gives 17.79% nitrogen as compared to 18.01% calculated for $C_{11}H_{11}N_3O_3$.

EXAMPLES 10, 11 AND 12

*5-[3-(3-chloro-4-nitrosophenyl)-3-(phthalimidomethyl)-ureido]-o-tolyl isocyanate*

*α-{p-[3-(3-chloro-4-nitroso)-3-(phthalimidomethyl)-ureido]-phenyl}-p-tolyl isocyanate*

*3-chloro-4-nitroso-N-(phthalimidomethyl)carbanilide*

These examples illustrate the preparation of derivatives of the product of Example 2 by condensing with isocyanates. In each case 63 grams (0.2 mole) of N-(3-chloro-4-nitrosoanilinomethyl)phthalimide is suspended in 300 ml. of heptane and 0.22 molecular proportions of isocyanate added thereto. The mixtures are stirred for 20 hours at room temperature, then filtered, washed with heptane and air dried. The isocyanates employed are respectively: 2,4-toluene-di-isocyanate, p'-diphenyl-methane-isocyanate, and phenyl-isocyanate to obtain 5-[3-(3-chloro-4-nitrosophenyl)-3-(phthalimidomethyl)ureido]-o-tolyl isocyanate, M.P. 121–126° C., α-{p-[3-(3-chloro-4-nitroso)-3-(phthalimidomethyl)ureido]-phenyl}-p-tolyl isocyanate, M.P. 120–124° C. and 3-chloro-4-nitroso-N-(phthalimidomethyl)carbanilide, M.P. 118–122° C. Analyses are recorded below:

| Empirical Formula | Nitrogen | |
|---|---|---|
|  | Found, percent | Calc., percent |
| $C_{24}H_{18}N_5O_5Cl$ | 14.11 | 14.30 |
| $C_{30}H_{20}N_5O_5Cl$ | 12.46 | 12.37 |
| $C_{22}H_{15}N_4O_4Cl$ | 13.60 | 12.90 |

EXAMPLE 13

*N-(m-chloro-p-nitrosoanilinomethyl)-1,2,3,6-tetrahydrophthalimide*

A glass reaction vessel is charged with 205 grams (2.5 moles) of 44.5% hydrogen chloride in methanol. The solution is cooled to 5° C. and 73 grams (0.25 mole) of N-(3-chloroanilino-methyl)tetrahydrophthalimide added. The reactor contents are again cooled to 5° C. and to the reactor is added in one portion 20 grams (0.29 mole) of 97% sodium nitrite. The reaction mixture is stirred at 10–20° C. for 4 hours, added to 1000 grams of ice water and its pH adjusted to 8 by addition of concentrated ammonium hydroxide. Solids are then filtered from solution and air dried. The product, M.P. 63–67° C., is obtained in 93.5% yield. It contains 12.89% nitrogen as compared to 13.16% calculated for $C_{15}H_{14}N_3O_3Cl$.

EXAMPLE 14

*N-(p-nitrosoanilinomethyl)-1,2,3,6-tetrahydrophthalimide*

Substituting N-(anilinomethyl)tetrahydrophthalimide in the same molecular proportion for N-(3-chloroanilinomethyl)-tetrahydrophthalimide in the procedure of Example 13 gives the desired product in 94.2% yield as a brown solid, M.P. 93–95° C. It contains 14.01% nitrogen as compared to 14.72% calculated for $C_{15}H_{15}N_3O_3$.

EXAMPLE 15

*3-(p-nitrosoanilinomethyl)-5,5-dimethyl hydantoin*

Substituting 3-anilinomethyl-5,5-dimethyl hydantoin in the same molecular proportion for N-(3-chloroanilinomethyl)-tetrahydrophthalimide in the procedure of Example 13 gives the desired product in 77.5% yield. After recrystallizing from dilute ethanol the product melts at 160–162° C.

EXAMPLE 16

*Zinc salt of N-(4-oxo-2,5-cyclohexadiene-1-ylideneiminomethyl)phthalimide*

A glass reactor is charged with 20 grams (0.076 mole) of N-(p-nitrosoanilinomethyl)phthalimide, 1000 ml. of water and 11.5 grams (0.072 mole) of 25% aqueous sodium hydroxide. The mixture is stirred at room temperature for about 1½ hours and to it is added in one portion 9.85 grams (0.072 mole) of zinc chloride in 200 ml. of water containing a drop of hydrochloric acid. The reaction mixture is stirred for one hour and the solids removed therefrom by filtration. The solid product, after washing with cold water and air drying, melts at 185–193° C. It contains 10.45% zinc as compared to 10.42% calculated for $C_{30}H_{20}N_6O_6Zn$.

EXAMPLE 17

*N-(p-nitrosophenyl)-N-(phthalimidomethyl)-β-alanine*

A glass reactor is charged with 34 grams (0.1 mole) of methyl N-phenyl-N-phthalimidomethyl-β-alaninate, 150 ml. of acetic acid and 16 ml. of concentrated hydrochloric acid. The mixture is stirred at 5–10° C. until solution is complete and 8 grams (0.125 mole) of 97% sodium nitrite in 25 ml. of water added dropwise over a period of 15 minutes. The reaction mixture is stirred for one hour at 5–15° C., then 400 ml. of ice water added to it, followed by 25% sodium hydroxide solution until a pH of 8 is reached. The solids are filtered from solution, washed and dried. The nitrosation is accompanied by hydrolysis of the ester to obtain essentially a quantitative yield of N-(p-nitrosophenyl)-N-(phthalimidomethyl)-β-alanine, M.P. 93–97° C. Analysis gives 11.7% nitrogen as compared to 11.9% calculated for $C_{18}H_{15}N_3O_5$.

EXAMPLE 18

*Zinc salt of N-(3-chloro-4-oxo-2,5-cyclohexadiene-1-ylideneiminomethyl)phthalimide, oxime*

Substituting N-(3-chloro-4-nitrosoanilinomethyl)-phthalimide in the same molecular proportion for N-(p-nitrosoanilinomethyl)phthalimide in the procedure of Example 16 results in the desired product, M.P. 211–216° C.

EXAMPLE 19

*N-(3-chloro-N-ethyl-4-nitrosanilinomethyl)phthalimide*

A glass reactor is charged with 32 grams (0.1 mole) of N-(3-chloro-N-ethylanilinomethyl)phthalimide, 120 ml. of glacial acetic acid and 16 ml. of concentrated hydrochloric acid. The mixture is stirred until solution is complete and then to it 8 grams (0.125 mole) of 97% sodium nitrite dissolved in 25 ml. of water is gradually added over a period of 30 minutes. During the addition the reaction mixture is stirred at 5–10° C. Stirring is continued at 0–10° C. for three hours after which 400 ml. of ice water is added and the pH adjusted to 8 by the addition of sodium hydroxide solution. Stirring is continued for an additional hour at 0–20° C., solids removed by filtration, washed with water and air dried. There is obtained 28 grams (81.6% yield) of the desired product, M.P. 166–169° C.

Thermal stability is demonstrated by differential thermal analysis. The differential thermal analysis provides a record of the differential temperature between the sample and an inert reference material as they are heated in an air furnace at a controlled rate. The rate of heat evolved can be calculated from the rate of change of the differential temperature. The apparatus is calibrated by means of an electrically heated sample tube. Graphs of heat evolution in cal./min./kg. of sample v. reciprocal of the absolute temperature are routinely prepared by this method. In this manner it may be shown that N-(p-nitrosoanilinomethyl)phthalimide and N-(p-nitroso-3-chloroanilinomethyl)phthalimide are stable indefinitely at a temperature below 90° C.

The new compounds are useful adjuvants in the heat processing of Butyl rubber. Butyl rubber is the well recognized and commonly employed generic name applied to a variety of elastic copolymers of isobutylene and small quantities of diolefins. The diolefins are usually selected so as to produce a final product which possesses only a small percentage of the unsaturation of natural rubber. The content of combined diolefin hydrocarbon commonly is not greater than 15%.

Heating Butyl rubber without curatives in the presence of small amounts of the compounds of this invention effects a reaction which not only increases the modulus of elasticity of the vulcanizates markedly but also retains reasonable elongations. The heating should be above 121° C. (250° F.) and preferably at 149–188° C. (300–370° F.) with heating times ranging from one minute to 16 hours. The compositions are masticated either during or after the heat treatment.

As illustrative of the properties of the new compounds typical examples are admixed with Butyl rubber in the following manner: The additive is incorporated with 400 grams of Butyl rubber on a mill at 50° C. in a period of about two minutes. Milling is continued for five minutes, cutting several times from each side to insure good dispersion. The mixture so obtained together with 1000 grams of Butyl rubber is charged to a pre-heated Banbury mixer at 150° C. The batch is mixed for one minute at 120 p.s.i.; thereupon carbon black and stearic acid are added and mixing continued for an additional nine minutes at 150° C. Proceeding in the manner described, compositions are compounded comprising:

| | Parts by weight | | | | | | | |
|---|---|---|---|---|---|---|---|---|
| Butyl rubber | 100 | 100 | 100 | 100 | 100 | 100 | 100 | 100 |
| Carbon black | 50 | 50 | 50 | 50 | 50 | 50 | 50 | 50 |
| Stearic acid | 1 | 1 | 1 | 1 | 1 | 1 | 1 | 1 |
| N-(3-Chloro-4-nitrosoanilino-methyl)phthalimide | | 0.1 | 0.2 | 0.3 | 0.5 | 0.75 | 1.0 | 1.5 |

The Butyl rubber is a copolymer of isobutylene and isoprene having a Mooney viscosity in the range of 61–70° C. and mole percent unsaturation in the range of 1.5–2.0, and the carbon black is a mixture of 15 parts of high abrasion furnace black and 35 parts medium processing channel black. Final compounding of vulcanizable stocks is effected on a mill at 50° C. with the roll clearance set at 0.014″. From the Banbury 225 gram portions are blended on the back roll for 15 seconds, 7.5 grams zinc oxide, 1.5 grams 2,2′-dithiobisbenzothiazole, 1.5 grams tetramethylthiuram disulfide and 3.0 grams sulfur are added in 2½ minutes. The mass is then blended two minutes on the back roll by rolling into a cylinder and passed through edgewise nine times with the mill rolls opened to 0.020″. Vulcanization is effected by heating in a press 45 minutes at 144° C. (291° F.). The physical properties are summarized in Table I.

TABLE I

| Amount of N-(3-Chloro-4-nitrosoanilino-methyl)phthalimide | Modulus of Elasticity in lbs./in.² at 300% Elongation | Tensile at Break in lbs./in.² | Ult. Elong., Percent | Torsional Hysteresis |
|---|---|---|---|---|
| None | 1,180 | 2,500 | 530 | .45 |
| 0.1 | 1,460 | 2,560 | 530 | .38 |
| 0.2 | 1,410 | 2,700 | 540 | .38 |
| 0.3 | 1,510 | 2,650 | 500 | .30 |
| 0.5 | 1,950 | 2,750 | 450 | .26 |
| 0.75 | 1,960 | 2,610 | 400 | .22 |
| 1.0 | 2,080 | 2,800 | 400 | .19 |
| 1.5 | 2,030 | 2,800 | 420 | .21 |

Torsional hysteresis was determined at room temperature with an apparatus which embodies a torsion pendulum. The sample of rubber tested supplies the force to restore the pendulum when it is deflected. The logarithmic decrement of the observed amplitude is recorded.

Reaction of Butyl rubber with the new compounds improves its adhesion to tire cord. Alternatively, the cord may be treated, as for example, by dipping into a solution or dispersion of the nitrosoamine, embedded in a vulcanizable elastomeric composition and the composition vulcanized to obtain a laminated fiber. Rayon tire cord is passed through an aqueous dispersion of the nitrosoamine, dried and incorporated into a composition comprising:

| | Parts by weight |
|---|---|
| Butadiene-styrene copolymer rubber | 100 |
| Carbon black | 25 |
| Zinc oxide | 5 |
| Saturated hydrocarbon softener | 7.5 |
| Sulfur | 3 |
| 2,2′-dithiobisbenzothiazole | 1.5 |

After vulcanizing by heating 30 minutes at 158° C. the following adhesion values are obtained by measuring pull-out with a Dillon tester.

| Nitrosoamine: | Pull-out value in pounds |
|---|---|
| None–control | 9–12 |
| N-(p-nitrosoanilinomethyl)phthalimide | 18.5 |
| N-(3-chloro-4-nitrosoanilinomethyl)phthalimide | 17.0 |
| N-(3-bromo-4-nitrosoanilinomethyl)phthalimide | 15.3 |
| N-(N-methyl-p-nitrosoanilinomethyl)phthalimide | 15.5 |
| N-[N-ethyl-N-(p-nitrosoanilino)methyl]-phthalimide | 16.5 |
| N-[N-(2-cyanoethyl)-4-nitrosoanilinomethyl]-phthalimide | 15.6 |
| Methyl N-(p-nitrosophenyl)-N-(phthalimidomethyl)-β-alaninate | 16.5 |
| N-(3-chloro-N,4-dinitrosoanilinomethyl)-phthalimide | 17.0 |

Adhesion of nylon cord is also enhanced but to a lesser degree. However, the new compounds have the valuable property of inhibiting heat degradation of nylon cord. The breaking strength of nylon cord is less than one-third the original value after heating 42 hours in an air oven at 150° C. but the degradation is much less after dipping the cord into a dispersion of one of the new nitrosoamines. Typical results are recorded below employing nylon cord having a breaking strength of about 32 pounds.

| Nitrosoamine: | Breaking strength after aging 42 hrs. at 150° C. |
|---|---|
| None–control | 9.5 |
| N-(p-nitrosoanilinomethyl)phthalimide | 27.1 |
| N-(3-chloro-4-nitrosoanilinomethyl)phthalimide | 22.2 |
| N-(3-bromo-4-nitrosoanilinomethyl)-phthalimide | 20.5 |

It is intended to cover all changes and modifications of the examples of the invention herein chosen for purposes of disclosure which do not constitute departures from the spirit and scope of the invention.

What is claimed is:

1. Nitrosoarylaminomethylimide characterized by the structure

where R is an organic amino substituent, in which nitrogen is linked to the methylene group in the brackets, selected from the group consisting of

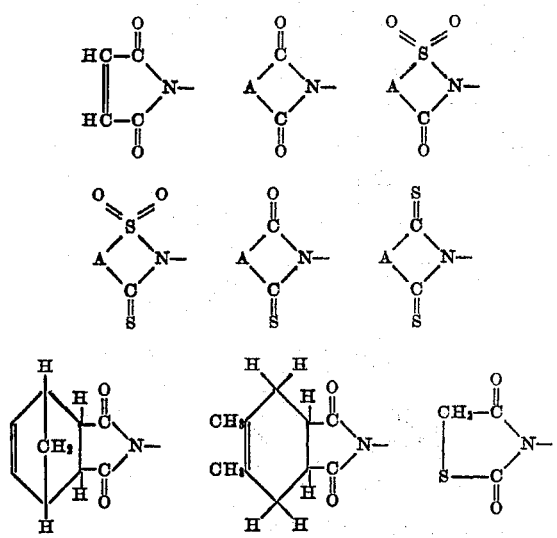

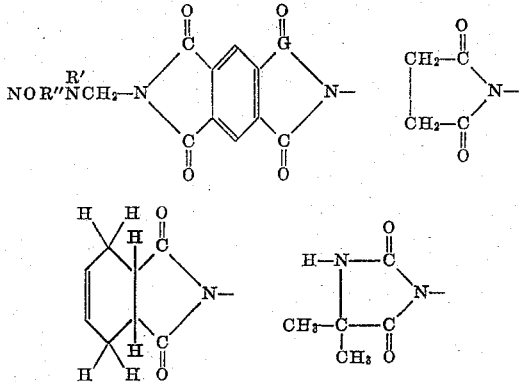

where A represents a radical selected from the group consisting of ortho-phenylene and substituted ortho-phenylene wherein the substituents are selected from the group consisting of halogen, lower alkyl, lower alkoxy and nitro, R' is selected from the group consisting of hydrogen, lower alkyl, nitroso, cyanoethyl, lower alkyl carboxy ethyl and carboxy ethyl groups, R'' is selected from the group consisting of phenyl and substituted phenyl wherein the substituents are selected from the group consisting of halogen, lower alkyl, lower alkoxy and nitro.

2. A compound having the structure

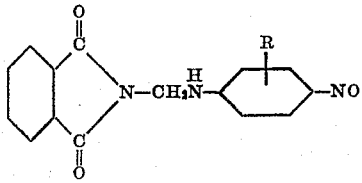

where R represents halogen.

3. A compound of the structure

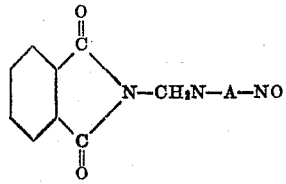

where A represents a six membered carbocyclic aromatic radical.

4. N-(3-chloro-4-nitrosoanilinomethyl)phthalimide.
5. N-(3-chloro-N,4-dinitrosoanilinomethyl)phthalimide.
6. Methyl-N-(p-nitrosophenyl)-N-(phthalimidomethyl)-β-alaninate.
7. N-(p-nitrosoanilinomethyl)phthalimide.
8. Zinc salt of N-(4-oxo-2,5-cyclohexadiene-1-ylidene-iminomethyl)phthalimide.

References Cited in the file of this patent

UNITED STATES PATENTS

| 2,170,191 | Fisher | Aug. 22, 1939 |
| 2,271,122 | Harman | Jan. 27, 1942 |
| 2,452,315 | Morgan et al. | Oct. 26, 1948 |
| 2,477,015 | Sturgis et al. | July 26, 1949 |
| 2,577,822 | Sparks et al. | Dec. 11, 1951 |
| 2,607,764 | Nelson et al. | Aug. 19, 1952 |
| 2,616,876 | Rehner et al. | Nov. 4, 1952 |
| 2,825,720 | Tawney | Mar. 4, 1958 |

OTHER REFERENCES

Arnold et al.: Chemical Reviews, p. 70, vol. 57, February–June 1957.

Winstead et al.: J. Am. Chem. Society, vol. 77, p. 1913 (1955).